Jan. 2, 1951
C. HOLMES
2,536,367
PUPILLOMETER HAVING MINIATURE CONDENSING
LENS FOR CREATING LIGHT IMAGES
Filed Aug. 12, 1946
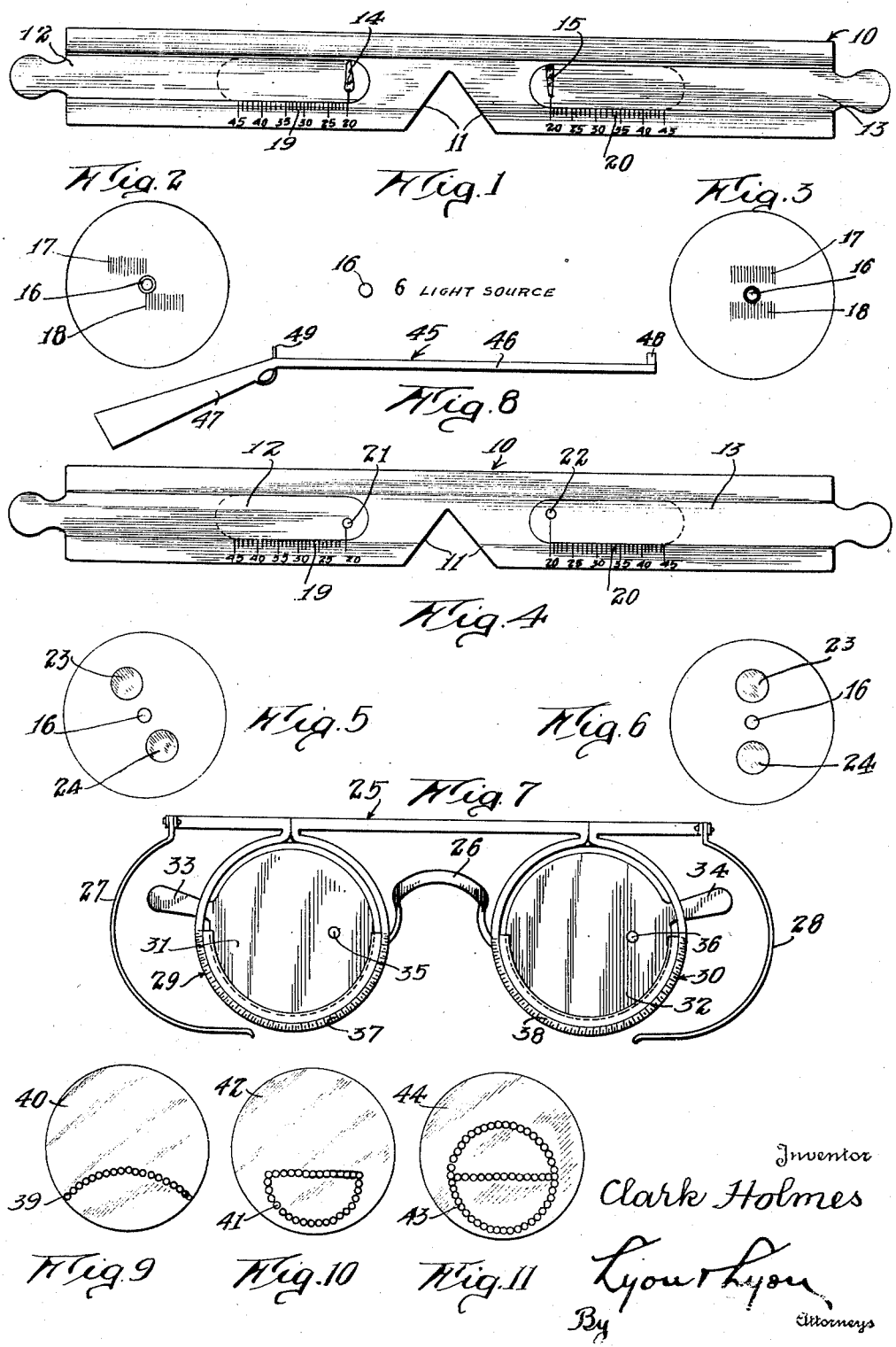
Inventor
Clark Holmes
By Lyon & Lyon
Attorneys Patented Jan. 2, 1951

2,536,367

UNITED STATES PATENT OFFICE 2,536,367

PUPILLOMETER HAVING MINIATURE CONDENSING LENS FOR CREATING LIGHT IMAGES

Clark Holmes, Los Angeles, Calif.

Application August 12, 1946, Serial No. 689,952

1 Claim. (Cl. 88—20)

The invention relates to a miniature lens image forming device and is particularly directed to the use of a miniature lens or miniature lenses in connection with a light source in such a manner that the eye of an observer may see simultaneously the source of light and all other visible objects in the field of view and superimposed over some portion of the observer's field of vision an image of light formed by said miniature lens or lenses.

Such miniature lenses may be of any suitable transparent material, and may assume any desirable form such as a spherical lens or a cylinder lens—either convex or concave—or may take the form of a truncated cone, and in some cases it may be advantageous to use a lens combining spherical and cylindrical forms with or without prism power. The size of such miniature lenses should normally be less than three millimeters in one dimension in order that such dimension may be less than the diameter of the pupil of the eye under the conditions of use and intensity of illumination.

The manner of use of such a lens or plurality of lenses can be advantageously described by illustration. With the observer fixing the vision of one eye on a light source, a miniature lens may be interposed between the eye and light source, and moved until it interrupts the line of sight. The observer is then aware of the light source and near it, apparently projected into space to a position near the source of light, a light image, assuming a form characteristic of the form of lens used. If the lens is spherical the light image is round in shape; if a cylindrical lens is used, the image comprises a series of lines forming a streak or band of light with its direction or length at right angles to the series of lines and at right angles to the axis of cylindrical lens. If a spherical lens is used, and it is so positioned between the eye and light source that its optical center falls exactly on the visual axis of the observer's eye, then the observer sees the light image exactly superimposed on light source, and the center of the light source and the center of the light image appear to coincide, their apparent overall size usually varying. The requirement above-mentioned concerning dimensions of the lens is here illustrated. If one dimension of lens is not less than the diameter of the pupil of the eye, the rays from the light source to the eye would be occluded, and the light would not be visible. Hence, the size of the lens in use must be small enough for simultaneous perception of light source and light image when in superimposed position.

The foregoing description uses the light source as a suitable point in the visual field to illustrate that the light source and light image can be superimposed, and both be simultaneously visible. It is a purpose of this invention to be able to create and superimpose light images over any portion of the visual field and have simultaneous perception of a light image and a portion of the visual field over which it is superimposed.

The effect thus created may be described by saying that the light image appears on the field of vision as if a spot of light had been used to illuminate that portion of the field of view.

Such miniature lens images may be employed in numerous applications, particularly where conditions require sharpness of definition of objects which are held close to the eye. The normal human eye cannot focus closer than four or five inches, approximately, which is known as the "blur distance," and accordingly, an object cannot be clearly seen if placed within the blur distance of the eye.

These various uses of miniature lenses do not all call for superimposing light images on light source, however. Some applications use the light source merely for the purpose of creating the light image, the relation of the light image to other objects within the range of vision being used for various purposes, as will more fully appear.

One of the principal advantages of this invention is that such miniature lenses gather light from the light source, and the observer sees the light image not at position in space occupied by the lens, but projected into space and apparently at some distance as the eye is then focused. Thus, an object held before the eye in approximately the plane normally occupied by a spectacle lens appears very blurred, and its usefulness as a sighting member or other use where good visual definition is needed becomes practically worthless. However, when a miniature lens is used in accordance with my invention, the projection of the light image is such that the projected light image is used instead of the blurred image of the lens itself, but with a degree of accuracy similar to that obtained where the image of the object is sharp and clear.

An illustration can easily be made of the efficiency of my invention by the following: On an ordinary spectacle lens a dot of black ink one millimeter in diameter was placed at the center of the lens. It was barely visible when the lens was worn before the eye, so as a sighting member it was useless. However, in same spot a small drop of water was placed. It acted as a miniature sphere lens and immediately became very noticeable as a glaring pin point of light which projected an image into the plane of a light source.

Accordingly, the principal object of this invention is to provide a miniature lens having at least one dimension smaller than the diameter of the pupil of a human eye positioned so that the eye may see all portions of its visual field and superimposed over some portion of the visual field, and simultaneously visible a light image created by the miniature lens in conjunction with a suitable light source.

Among the useful applications of this image forming apparatus is a device for measuring pupillary distance of human eyes utilizing miniature lenses of the type described.

Another useful application of my invention is to provide a bifocal field finder incorporating a series of miniature lenses of the type described.

A further useful application of the principles of my invention relates to a gun sight incorporating a light source at the far end of the barrel and a miniature lens of the type described mounted at the near end of the barrel.

Other objects and advantages will appear hereinafter.

In the drawings:

Figure 1 is a diagrammatic illustration of a device for measuring pupillary distance and incorporating a preferred embodiment of my invention.

Figure 2 is a view of the light source and images seen by an observer prior to movement of the various parts of the device to final position.

Figure 3 is a view of the light source and images seen by an observer after the adjustable elements of the device have been moved to final position.

Figure 4 is a diagrammatical illustration of another form of pupillometer incorporating essential features of my invention.

Figure 5 is a view similar to Figure 2 showing relationship of images to light source before moveable parts of the device reach final position.

Figure 6 is a view similar to Figure 3 showing relationship of images with respect to the light source after the moveable parts of the device reach final position.

Figure 7 is a diagrammatic illustration of a device for measuring difference in level of human eyes prior to the fitting of spectacles and incorporating essential features of my invention.

Figure 8 shows an adaptation of the plan of my invention applied to sights for a gun.

Figures 9, 10, and 11 show various forms of bifocal field finders incorporating miniature lenses of the type utilized in connection with my invention.

Referring to the drawings the pupillometer illustrated in Figure 1 includes a frame 10 having a recess or opening 11 adapted to rest on the bridge of the nose and a pair of sliding carriers 12 and 13 which may be formed of transparent material. A frustoconical lens 14 is mounted with its axis vertical and its small end up. An identical lens 15 is mounted on the carrier 13 with its big end up. The carriers 12 and 13 are arranged for horizontal sliding movement so that their direction of motion is at right angles to the axes of the miniature lenses 14 and 15.

A light source 16 of any suitable type, but preferably of small diameter is positioned at a distance from the frame 10 in position in front of the eyes of the observer. The field of view may appear to the observer as illustrated in Figure 2. Since the largest diameter of the frustoconical lenses is less than the diameter of the pupil of the eye each eye will see the light source by sighting around its respective lens and each eye will simultaneously see a projected image of the light source through the lens. This projected image takes the form of a series of lines spaced very close together and giving the general appearance of a streak or band of light.

In Figure 2, the band 17 is the image formed by the lens 14 while the band 18 is the image formed by the lens 15. The bands are not on the same level because of the taper of the lenses. If the lenses were cylindrical the bands would appear on the same level with the light source. When the images seen by the observer appear offset, as in Figure 2, the carriers are not correctly adjusted to indicate the correct pupillary distance. The carriers 12 and 13 are then independently adjusted until the observer brings the bands 17 and 18 into the position shown in Figure 3. A reading on the millimeter scales 19 and 20 carried on the frame 10 then provides an accurate measurement of the pupillary distance.

It is contemplated that cylindrical lenses instead of frustoconical lenses might be employed, and in such case it would be advantageous to make one or both of the lenses of colored material; thus, the lens 14 might be red and the lens 15 green. In this manner the images 17 and 18 projected by the lenses would be different in color although on the same level, and therefore facilitate adjustment of the carriers 12 and 13 to bring the two bands into the position shown in Figure 3. Non-colored cylindrical lenses have the disadvantage that the images 17 and 18 which they produce lie in the same place and accordingly the confusion of the individual lines of one band with lines of the other band make it difficult to determine when one band lies directly over the other.

While the carriers 12 and 13 have been described as being formed of transparent material it is recognized that this is not a limiting feature since openings could be provided in opaque carriers and positioned adjacent the location of the lenses so that light from the source 16 could pass through the openings on both sides of the lenses.

The modified form of pupillometer shown in Figure 4 may include the same frame 10 and carriers 12 and 13. Spherical lenses 21 and 22 are provided on the carriers and these lenses are preferably in the form of a hemisphere formed of transparent material and attached by any convenient means to the transparent carriers 12 and 13. The lenses are not mounted on the same horizontal line but on the contrary are displaced vertically therefrom so that the miniature lens 21 is lower than the lens 22. This difference in elevation serves to separate the images 23 and 24 which are seen by the observer. The diameter of each spherical lens is less than the diameter of the pupil of the eye.

In a manner similar to that described in connection with Figure 1 the observer adjusts the slidable carriers 12 and 13 until the images 23, 24 are directly above and below the light source 16. The reading on the scales 19 and 20 then gives an accurate measurement of the pupillary distance. If desired the lenses 21 and 22 or either of them could be made of colored material after the manner and for the purpose described in connection with Figure 1.

The device shown in Figure 7 includes a frame 25 having a nose piece 26, ear pieces 27 and 28 and a pair of depending annular calibrated rings 29 and 30. A transparent disk 31 is rotatably mounted in the ring 29 and a similar disk 32 is rotatably mounted in the ring 30. Radially extending tabs 33 and 34 are provided on the disks 31 and 32 for manually rotating the disks within the rings. At a point located eccentrically from the center of the disk 31 is a miniature spherical lens 35 which is attached to the disk in any convenient manner. Similarly, miniature spherical lens 36 is attached to the disk 32 in an eccentric position. The amount of eccentricity of the location of the lenses with respect to the center of the disks may be any convenient dimension, but in practice it has been found that ten millimeters is satisfactory and the distance between the centers of the disks 31 and 32 may be standardized at sixty millimeters if desired.

In use, the frame 25 is placed on the head of the observer who looks through the transparent disks 31 and 32 toward a distant light source, not shown. The observer then turns the tabs 33 and 34 until the images projected by the miniature lenses 35 and 36 appear to lie in the same plane. Scales 37 and 38 on the stationary rings 29 and 30 are calibrated to indicate the position of the lens below a line intersecting the centers of the two disks. The frame and disks are first oriented to give the best cosmetic appearance on the face. After this adjustment is made movement of the head and frame does not affect the proper reading of differences in eye levels and, therefore, it is not important that the head and frame be held steady or level during the test. While spherical lenses have been illustrated, it is recognized that miniature lenses of any convenient type might be employed.

The bifocal field finders illustrated in Figures 9, 10 and 11 may be used in connection with a stationary frame such as that shown in Figure 7 for indicating to a patient the approximate size and field available in different types of bifocal or trifocal lenses.

In Figure 9 a series of miniature lenses 39 is arranged on a transparent carrier disk 40. When the observer looks through the disk 40 at a distant light source, not shown, a bright line will divide his field of vision and the position and shape of the line are determined by the location of the miniature lenses on the disk. The series of miniature lenses 41 on the disk 42 is arranged after the manner of an inverted semi-circle and will form this inverted semi-circle as a bright continuous line in space when sighted through by an observer toward a distant light source. Similarly, the double semi-circle arrangement 43 on the transparent disk 44 will indicate to a patient the field of vision to be expected from the various divisions in a trifocal lens. The use of such bifocal field finders is particularly advantageous because it forms a sharp outline in space which is easily seen by a prospective wearer of spectacle lenses and is free from the blurred image which would be produced if ordinary bifocal or trifocal lenses were placed in position on the frame 25.

Figure 8 shows a device of employing the principle of my invention in connection with gun sights. A gun 45 having a barrel 46 and stock 47 may be provided with a small light source 48 at the far end of the barrel and a miniature lens 49 mounted in any convenient fashion at the near end of the barrel. The user of the gun sights through the miniature lens toward the light source and sees the light source directly by sighting around the lens as well as simultaneously seeing the image projected by the miniature lens. The gun is moved until the image appears to be directly over the target. At this point the gun is properly aligned with the target. Since the shape of the projected image depends upon the shape of the miniature lens it is preferred to employ a spherical lens rather than one of the other types shown and described herein.

It will be understood from the foregoing description of the various embodiments of my invention that in each case the miniature light condensing lens is shaped so that the eye does not see anything through it but so that a bright spot of light is cast into the field of view when used in conjunction with a light source. Accordingly, the term "light condensing lens" as used in this specification and claims refers to a lens having such a shape that the human eye is unable to see an object through it, whether used alone or in conjunction with another lens.

Many other embodiments of the invention may be resorted to without departing from the spirit of the invention.

I claim:

A pupillometer for use with a light source and provided with a stationary reference frame, a pair of transparent carriers slidably mounted on the frame, and a miniature light condensing lens on each carrier having at least one dimension smaller than the diameter of the pupil of the eye, so that the eye by sighting around the lens has an unobstructed field of vision and may simultaneously see a light image created by the lens and a light source superimposed upon some portion of the field of vision.

CLARK HOLMES.

REFERENCES CITED

The following references are of record in the file of this patent:

UNITED STATES PATENTS

| Number | Name | Date |
| --- | --- | --- |
| 306,919 | Hanna | Oct. 21, 1884 |
| 729,848 | Common | June 2, 1903 |
| 934,579 | Straubel et al. | Sept. 21, 1909 |
| 1,264,133 | Morris | Apr. 23, 1918 |
| 1,327,163 | Mathewson et al. | Jan. 6, 1920 |
| 1,602,116 | Manahan et al. | Oct. 5, 1926 |
| 1,726,314 | Rose | Aug. 27, 1929 |
| 1,935,175 | Clement | Nov. 14, 1933 |
| 1,981,439 | Smith | Nov. 20, 1934 |
| 1,985,067 | Wangersleb | Dec. 18, 1934 |
| 2,326,030 | Hearn | Aug. 3, 1943 |
| 2,376,554 | Ranoe | May 22, 1945 |
| 2,389,428 | Glasser | Nov. 20, 1945 |
| 2,393,308 | Brown | Jan. 22, 1946 |

FOREIGN PATENTS

| Number | Country | Date |
| --- | --- | --- |
| 170,415 | Germany | May 1, 1945 |